(12) United States Patent
Lewis et al.

(10) Patent No.: US 6,980,362 B2
(45) Date of Patent: Dec. 27, 2005

(54) OPTICAL FILTERS

(75) Inventors: Keith Loder Lewis, Malvern (GB); Gilbert William Smith, Malvern (GB); Mark Edward McNie, Malvern (GB)

(73) Assignee: Qinetiq Limited, (GB)

( * ) Notice: Subject to any disclaimer, the term of this patent is extended or adjusted under 35 U.S.C. 154(b) by 0 days.

(21) Appl. No.: 10/433,217

(22) PCT Filed: Nov. 23, 2001

(86) PCT No.: PCT/GB01/05152

§ 371 (c)(1),
(2), (4) Date: May 30, 2003

(87) PCT Pub. No.: WO02/44788

PCT Pub. Date: Jun. 6, 2002

(65) Prior Publication Data

US 2004/0057144 A1    Mar. 25, 2004

(30) Foreign Application Priority Data

Nov. 30, 2000 (GB) .................................. 0029224

(51) Int. Cl.[7] .............................................. G02B 1/10
(52) U.S. Cl. ........................................ 359/580; 385/37
(58) Field of Search ...................... 359/260, 577–580, 359/587, 588; 385/37; 356/519

(56) References Cited

U.S. PATENT DOCUMENTS

| | | | |
|---|---|---|---|
| 4,915,463 A * | 4/1990 | Barbee, Jr. .................. | 359/360 |
| 5,022,745 A | 6/1991 | Zayhowski et al. | |
| 5,119,231 A * | 6/1992 | Nelson et al. .............. | 359/359 |
| 5,170,290 A | 12/1992 | Land et al. | |
| 5,212,745 A | 5/1993 | Miller | |
| 5,225,930 A * | 7/1993 | Land et al. .................. | 359/578 |
| 5,500,761 A | 3/1996 | Goossen et al. | |
| 5,701,193 A | 12/1997 | Vogel et al. | |
| 5,719,989 A * | 2/1998 | Cushing ..................... | 359/589 |
| 5,739,945 A | 4/1998 | Tayebati | |
| 5,825,528 A | 10/1998 | Goossen | |
| 6,415,073 B1 * | 7/2002 | Cappiello et al. ............. | 385/24 |
| 6,459,533 B1 * | 10/2002 | Clapp et al. ................ | 359/578 |

FOREIGN PATENT DOCUMENTS

EP    0 837 356    4/1998

(Continued)

OTHER PUBLICATIONS

Jerman et al., "A miniature Fabry-Perot interferometer with a corrugated silicon diaphragm support", *Sensors and Actuators*, A29, pp. 151-158 (1991).

(Continued)

*Primary Examiner*—Mark A. Robinson
*Assistant Examiner*—Alessandro Amari
(74) *Attorney, Agent, or Firm*—McDonnell Boehnen Hulbert & Berghoff LLP

(57) ABSTRACT

An optical interference filter (2) is provided by a substrate (1) in which is formed a plurality of parallel slots so as to define layers (slots and substrate laminae) of alternating refractive index. As shown, the filter comprises a central Fabry-Perot resonator slot cavity (3) between two mirror groups (4, 5) of alternating slots and substrate laminae, and is coupled to optical fibers (7) accommodated in V-grooves (6) on either side. For tuning, one mirror group (5) may be movable in the direction of arrow (A), or, where the central resonator is provided by substrate material, by altering its temperature. One or more further Fabry-Perot filters may be formed in the substrate and coupled to the filter (2). The invention encompasses non-resonating filters.

23 Claims, 3 Drawing Sheets

FOREIGN PATENT DOCUMENTS

| | | |
|---|---|---|
| WO | WO 99/47956 | 9/1999 |
| WO | WO 00/45201 | 8/2000 |

OTHER PUBLICATIONS

Jerman et al., "Miniature Fabry-Perot Interferometers Micromachined in Silicon for Use in Otpical Fiber WDM Systems", *Proc IEEE 1991 Confer. Solid States Sensors and Actuators*, pp. 372-375.

Han et al. "Deflection Behavior of Fabry-Perot Pressure Sensors Having Planar and Corrugated Membrane", *SPIE Proc.* vol. 2882, pp. 79-90 (1996).

* cited by examiner

Transmittance (%) and Optical Density vs Wavelength (nm)

Transmittance (%) and Optical Density vs Wavelength (nm)

Transmittance (%) and Optical Density vs Wavelength (nm)

OPTICAL FILTERS

Requirements for new devices to support the exploitation of wavelength division multiplexing (WDM) in telecommunication systems continue to grow. In such systems, data is transmitted as a stream of pulses of light, generated by semiconductor lasers and detected by photoconductive or photovoltaic sensors. In general, the message carrying capacity of the system is determined by the propagation properties of the fibre, the number of discrete wavelengths of light propagating to form different communication channels, and the effectiveness of time division multiplexing techniques to allow several messages to be combined at a single communication wavelength.

Conventionally, components required for separating the different optical channels in the system e.g. for add/drop multiplexers are formed from fibre Bragg gratings or complex interference filter structures deposited by vacuum deposition. The latter devices are usually based on multilayer stacks of two materials with contrasting refractive indices (e.g. titania/silica or tantala/silica), and the stack design is optimized around variants based on coupled Fabry Perot etalons, to realize the required passband characteristics, with bandwidths typically of the order of 0.4 nm at design wavelengths close to 1550 nm. The filters are complex and require the deposition of several hundred discrete layers of material with tight control of film thickness. Criteria for enhanced stability (both to temperature and moisture) also drive the need to use fabrication techniques which ensure the deposition of films free from porosity and which are fully densified. Such devices are then cut to the required size (typically 1–2 mm square) and incorporated into the WDM device package. Separate filters are required for each of the discrete communication wavelengths across the 1500–1580 nm band. Despite such complexities, such devices have become standard for use in current networks.

For in-line packages, there is need to adapt from the waveguide propagation mode used for the transmission of light to a mode where light is incident on the filter stack at close to normal angles of incidence. This need limits the degree to which the device package can be miniatised and also hinders the provision of characteristics in which the filter response can be tuned to allow wavelength-tuning or frequency hopping.

Various other forms of device have been explored at different times to reduce the cost of manufacture and to provide the benefits of frequency agility which allow many different functions (e.g. switching, modulation, detection, multiplexing) to be performed by the same device. Variants include the use of electro-optic materials such as lithium niobate and polymer dispersed liquid crystals which allow the refractive index of elements within the filter to be controlled, so changing the response characteristics of the device. Other concepts have been based on micro-optical electromechanical systems (MOEMS or MEMS) exploiting the physical movement of mirror groups within the device. Example of such devices may be found in the following documents:

1. J H Jarman, D J Clift and S R Mallinson, "A Miniature Fabry-Perot Interferometer with Corrugated Silicon Diaphragm Support", Sensors and Actuators A29, 151–158 (1991).
2. J H Jarman and D J Clift, "Miniature Fabry-Perot Interferometers Micromachined in Silicon for Use in Optical Fibre WDM Systems" Proc IEEE 19991 Conf. Solid State Sensors and Actuators.
3. J Han and D P Neikirk, "Deflection Behaviour of Fabry-Perot Pressure Sensors Having Planar and Corrugated Diaphragms", SPIE Proc 2882, 79–90 (1996).
4. U.S. Pat. No. 5,022,745, J J Zayhowski and A Mooradian (Electrostatically Deformable Single Crystal Dielectrically Coated Mirror).
5. U.S. Pat. No. 5,500,761, K W Goosen and J A Walker (Micromechanical Modulator).
6. U.S. Pat. No. 5,825,528 K W Goosen (Phase Mismatched Fabry-Perot Cavity Micromechanical Modulator).
7. U.S. Pat. No. 5,739,945, P Tayebati (Electrically Tunable Optical Filter Utilising a Deformable Multilayer Mirror.
8. U.S. Pat. No. 5,701,193, P Vogel, O Anthamatten and R Battig (Optical Reflection Modulator).

Typically these devices are manufactured using multi-step lithography/etching processes, to form the active device in a geometry conformal to the plane of silicon substrates. The number of filter elements possible in such devices is small, which limits the degree of optical contrast achievable around the design wavelengths. Furthermore, stress effects induced as a result of the fabrication of the silicon membrane structures result in curvature of the elements and consequent broadening of the spectral characteristics of the device. Such filters are tuned by application of an electrostatic field or by exploiting thermo-optic effects arising from the temperature variation of the refractive index of silicon.

This invention involves a novel approach to the design and fabrication of micro-optical filters, including MOEMS-based filters, which overcomes most of the difficulties encountered in the conformal approach. The invention provides an optical filter comprising a substrate in which is formed a plurality of parallel slots so as to define layers (slots and substrate laminae—the latter are also termed lamellae, but the former term will be used herein) of alternating refractive index.

Preferably the slots are generally perpendicular to a surface of the substrate, and in the embodiments they extend inwardly from a single surface of the substrate. Where coupling to and/or from an optic fibre is required, the said single surface may be formed with a groove on at least one side of the plurality of slots for accommodating the optic fibre(s).

A filter according to the invention may comprise a series of contiguous said layers of the form $(aH\,bL)^x$ where aH denotes a layer of high refractive index provided by the substrate material, bL denotes a layer of low refractive index provided by a said slot, a and b denote respective integral numbers of quarter wave thicknesses of said layers, and x is an integer denoting the number of repetitions of the unit (aH bL).

The substrate may be of silicon, or a high refractive index semiconductor material. Other materials could be used provided they have a sufficient refractive index to be used in a practical device.

In its broadest aspect the invention embraces filter constructions which are not Fabry-Perot filters, and these can provide fairly broad wavelength characteristics useful in some device architectures. However, preferred embodiments of the invention comprise a central Fabry-Perot cavity (or resonator region—the terms will be used interchangeably hereafter) with an optical thickness of an integral number of half wavelengths. This may be defined by a central slot, or by a central laminar portion of the substrate material between two slots. Further slots and substrate laminae either side of the cavity define interference structures for modifying the optical characteristics of the cavity as explained in more detail below in relation to the embodiments.

Means may be provided for altering the optical thickness of the central cavity to tune the filter. Where the cavity is defined by a central slot, this may comprise means for altering the physical thickness of the cavity, such as by an electrostatic comb drive, a piezoelectric drive, or the use of an actuator using a shape memory alloy. Where the cavity is defined by a central substrate portion, its refractive index may be varied to tune the filter, by heating or cooling. For example an electric current may be passed through an electrically conductive substrate for heating. Alternatively the substrate may be provided with a heating means such as thermoelectric means (also for cooling), or an electrically resistive means e.g. a film of metal alloy or indium tin oxide, through which electric current may be passed. Tuning may be for setting up purposes, or for frequency selection in use.

The filter may be of the general form (aH bL)^x cH dL eH (fL gH)^y where aH, cH, eH and gH denote integral multiple quarter wave thick layers of high refractive index material provided by the substrate; bL, dL and fL denote integral multiple quarter wave thick layers of low refractive index provided by the slots. The integers a, b, f and g denote an odd number of quarter waves, and in particular cases the values of a and b may equate to d and f respectively, while in other cases they may be different For a central low refractive index (slot) cavity dL, the integers c and e denote an integral odd number of quarter waves whereas d is an integral even number of quarter waves at the design wavelength of the cavity. For a central high refractive index (substrate) cavity, d is zero and cH and eH are taken together to provide an integral multiple half wavelength thickness (c+e)H. The operators ^x and ^y indicate that the associated components (aH bL) and (fL gH) may be repeated a plurality of times x and y if appropriate.

Fabry-Perot filters constructed according to the invention may include at least one further Fabry-Perot cavity optically coupled to the said cavity, for example using the convention above a filter of the form (aH bL)^x aH dL aH (bL aH)^2x dL aH (bL aH)^x, where a and b are different odd integers, and d is an even integer. For digital frequency stepping, one cavity is tuned, for example, and thereafter the other cavity or cavities are tuned to match, again for example using one of the methods mentioned above. Transmission and filtering will only be expected to occur once matching has been achieved.

Further features of the invention will become apparent upon a reading of the appended claims, to which the reader is referred, and to a consideration of the following more detailed description of examples of the invention made with reference to the accompanying drawings, in which:

Figure 1:
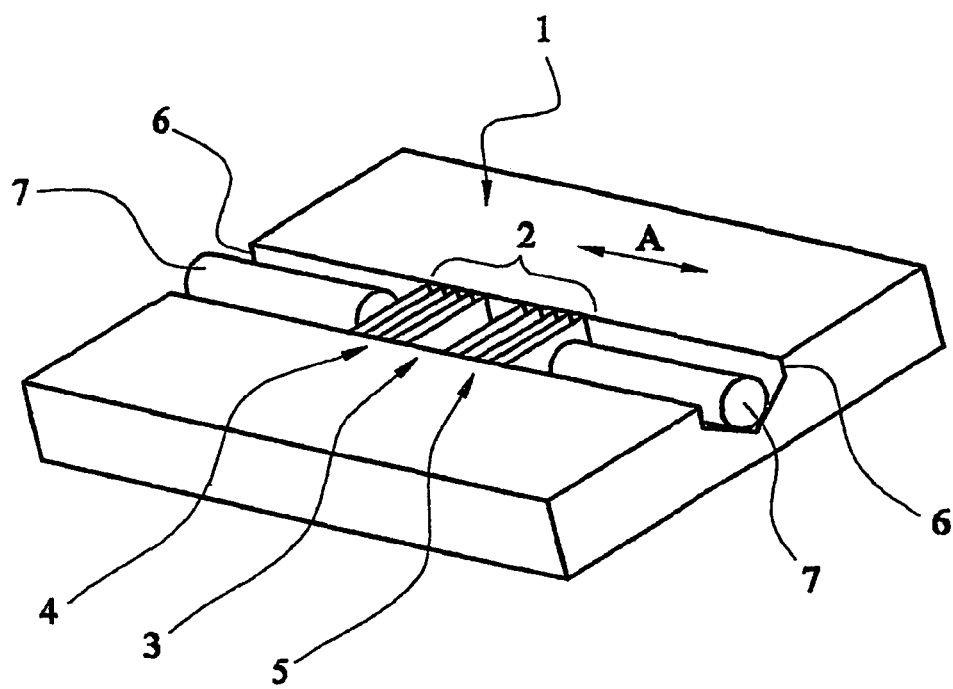
FIG. 1 shows in schematic perspective view a first general example of Fabry-Perot filter according to the invention, having a central air gap cavity in a silicon substrate.

FIG. 1 shows a schematic diagram of a first embodiment of filter according to the invention. A silicon substrate 1 is provided with a filter element 2 between a pair of V-bottomed grooves 6 for accommodating input and output optic fibres 7. The element 2 includes a central air cavity 3 between a mirror group 4 and a mirror group 5. The cavity 3 is essentially a slot extending into the substrate orthogonally from its surface, and each mirror group is defined by further slots which are parallel to the slot of cavity 3 and also extend orthogonally from the same substrate surface, whereby to leave thin substrate laminae spaced by air gaps. Cavity 3 and the groups 4 and 5 are formed by exploiting deep-dry etching techniques such as those provided by the Bosch STS process, which enables the provision of etched vias with aspect ratios in excess of 30:1 under optimised conditions. In use, means are provided to ensure adequate collimation of light entering or leaving the fibres, for example precision lens elements fitted at the ends of the fibres.

This construction possesses an integral orthogonal geometry relative to the plane of the silicon substrate surface, and this presents many advantages in the realisation of effective devices, for example:

(a) The various "layers" in the filter are defined simply by lithography on the surface of the wafer. Using stepper techniques with 10:1 magnification and electron beam generated master patterns, reproducabilities of better than 1% are easily achievable for the different elements of the filter.

(b) The filter elements are stabilized by the silicon sidewalls so providing a structure which is far more immune to acoustically-induced effects (microphony).

(c) The difference in the refractive indices of silicon and air allows the realisation of high finesse cavities with a minimal number of elements in the filter. A simple mirror structure with only 3 silicon elements either side of the cavity is sufficient to generate rejection levels of 25 dB for wavelengths more than 1 nm away from the cavity resonance.

(d) Designs exploiting high order resonance effects can be readily exploited and actually simplify the construction of the device.

(e) Etch depths commensurate with the full diameter of commercial optical fibres can be readily achieved, so simplifying the provision of optical connections and associated packaging.

(f) Frequency agility can be provided by virtue of the movement of one of the filter groups, or by the exploitation of temperature induced refractive index changes within the cavity or mirror groups.

For operation at 1550 nm, a conventional Fabry-Perot etalon would have a design of the form (HL)^2 H 2L H (LH)^2, where H and L denote integral quarter wave thicknesses of silicon and air respectively, and the operators ^2 indicate the number (2) of repetitions of the associated (HL) or (LH) component This would mean that the thicknesses of the individual components of the mirror would require to be about 110 nm for the silicon and 380 nm for the air gaps. Such dimensions are difficult to achieve on an accurate and reproducible basis using modem lithographic techniques and would severely limit the depth of etching. Nevertheless, some workers have tried to fabricate devices by etching 3 micron deep cascaded photonic bandgap structures onto the surfaces of silicon waveguides defined by buried oxide layers. The effective contrast between the high and low refractive index regions of the device is typically about 0.04 for 1 micron etch features in silicon on insulator (SOI) substrate material. This compares with a refractive index contrast of close to 2.5 achievable for a silicon/air system as may be provided by the present invention.

Figure 2:
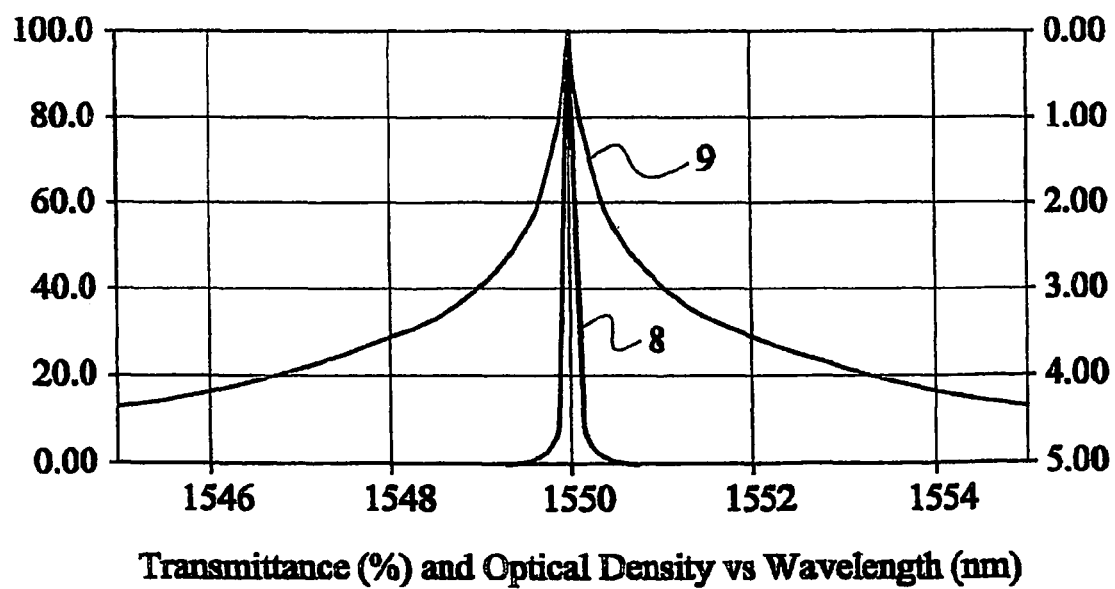
FIG. 2 illustrates the optical transmission characteristics of a specific example of a filter of the type generally shown in FIG. 1.
Figure 3:
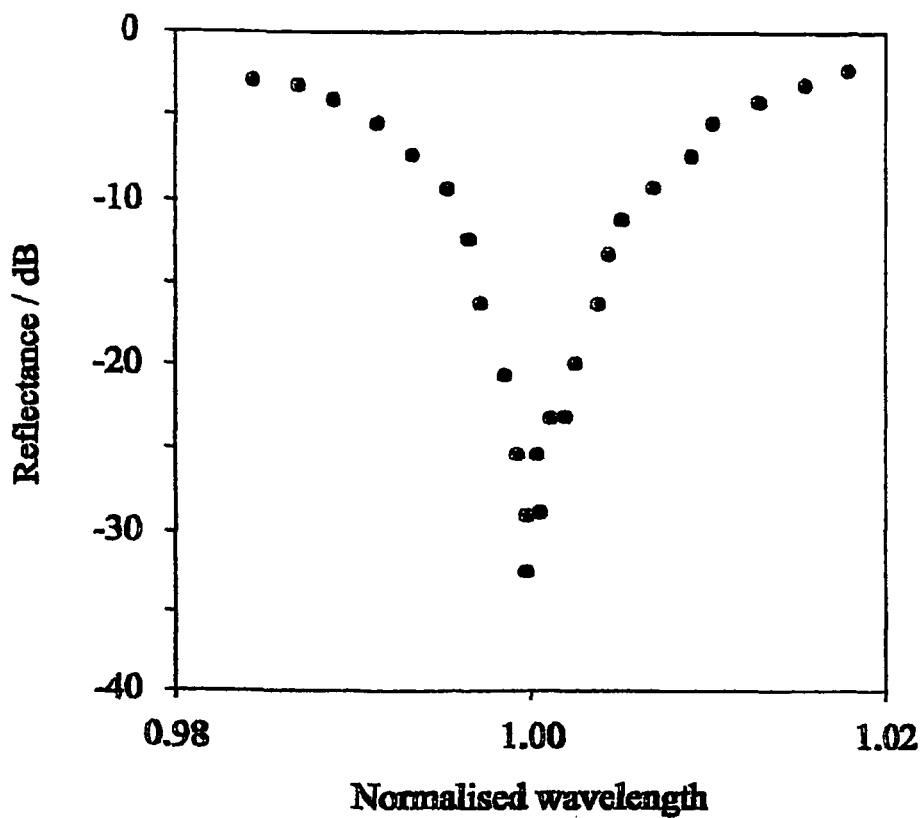
FIG. 3 shows an experimental plot of reflectance against normalised wavelength.
Figure 4:
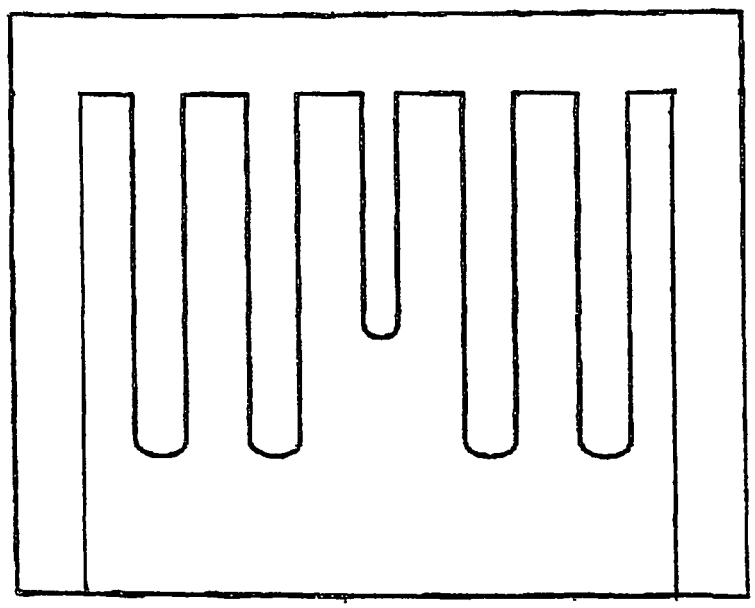
FIG. 4 is derived from a cross-sectional scanning electron micrograph of the filter to which FIG. 2 relates.

When high-order designs are exploited, as is possible in the present invention, the ability to achieve etch depths close to the full diameter of optical fibres becomes feasible. One example of the construction of FIG. 1 has the form (27H 9L)^2 27H 8L 27H (9L 27H)^2. The spectral characteristics thereof are shown as a theoretical plot in FIG. 2, where the central sharp curve 8 indicates transmittance and the broader curve 9 indicates optical density, and an experimental plot of reflectance against normalised wavelength is shown in FIG. 3. The silicon and air mirror elements are now close to 3 microns (27H) and 3.5 microns (8L) thick respectively. The rejection characteristics are set by the design of the mirrors around the central 8L cavity, the role of the outer mirror groups 4, 5 being to define the locus of the rejection minimum, which is relatively insensitive to tolerancing of the airgaps. The (27H 9L) period provides for full coverage of the 1530–1570 nm band, with out-of-band rejection levels in excess of 40 dB provided that manufacturing tolerances are tight FIG. 4 is a schematic showing derived from a scanning electron micrograph of a part of a cleaved device fabricated to this design highlighting the lack of curvature in the silicon mirror webs. By changing the mirror pair to (21H 5L), the breadth of the rejection region is widened and for 1520–1580 nm is in the excess of 40 dB.

The temperature coefficient of refractive index is such that the cavity resonance of the (27H 9L)^2 27H 8L 27H (9L 27H)^2 device shifts by 3 nm for temperature variation from 0 to 65° C. This would normally be unacceptable for commercial applications, but can easily be overcome by controlling the temperature of the device using simple low-power thermoelectric coolers for example.

Figure 5:
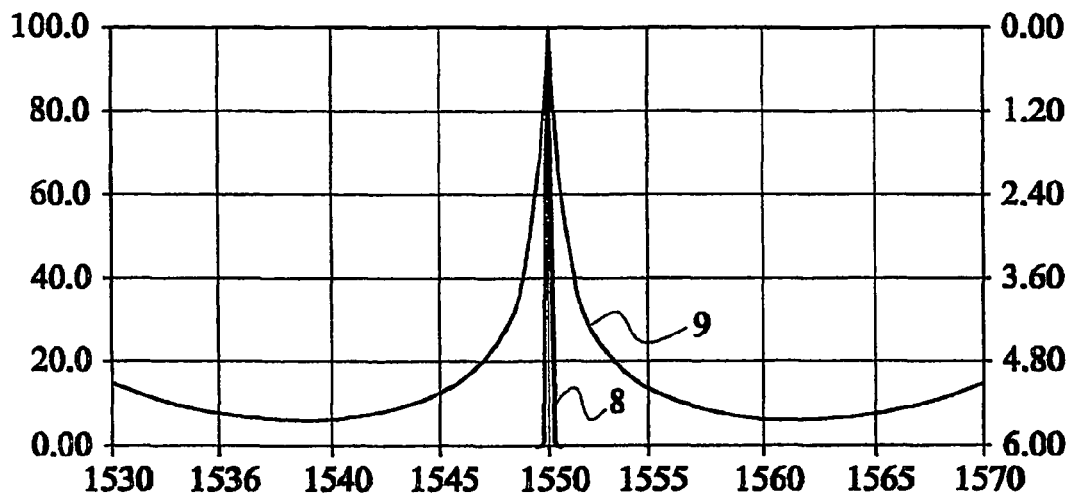
FIG. 5 illustrates the optical transmission characteristics of a second example of Fabry-Perot filter according to the invention which is based on a silicon—air gap structure and has a solid silicon central cavity spacer.

Much of the discussion has so far centred on the exploitation of air-gapped designs. Alternative structures are possible, based on the use of solid silicon cavities. FIG. 5 shows the spectral characteristics of a design based on the sequence (27H 9L)^3 28H (9L 27H)^3.

Various coupled cavity designs are also possible, although there is a limit to what is practically achievable. Triple cavity filters would require tolerancing of feature sizes to better than 0.1% which is not yet feasible using current manufacturing technology. A more practical form of device is the two-cavity design which eases the tolerancing of wavelength positioning in relation to laser sources which themselves have some degree of instability. Such designs can also provide improved out-of-band rejection characteristics.

Figure 6:
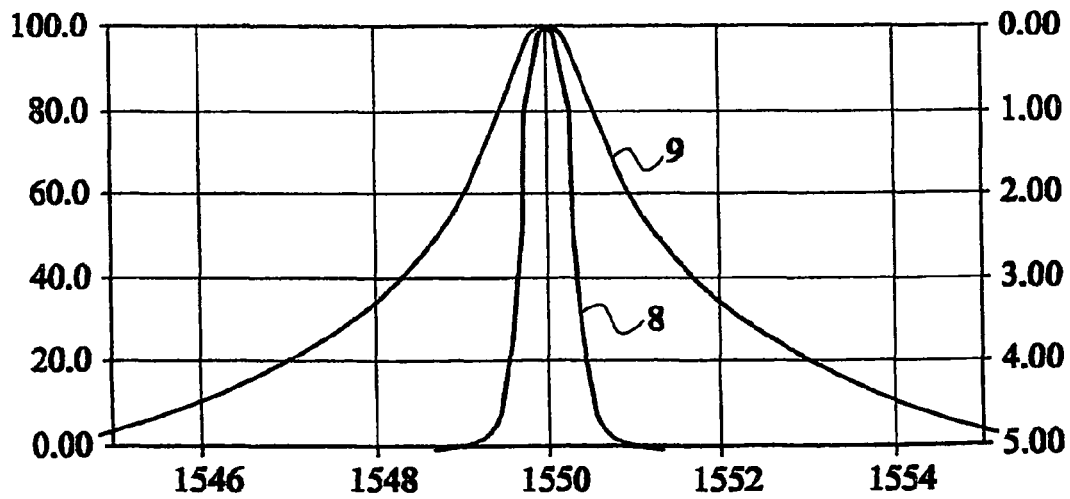
FIG. 6 illustrates the optical transmission characteristics of a two cavity silicon-air gap Fabry-Perot etalon constructed according to the invention.

FIG. 6 shows the spectral characteristics of such a device based on the sequence (37H 9L) 37H 8L (37H 9L)^3 37H 8L 37H (9L 37H). Here, the out-of-band rejection characteristics are similar to those achieved in FIGS. 2 and 3, but the pass-band has been broadened to allow for a degree of tolerancing in the positioning of the laser line.

Frequency agility can be achieved in a number of ways. For the single air cavity device of FIG. 1, one of the mirror groups (shown as group 5) could simply be moved by freeing the mirror assembly from its pedestal and providing electrostatic comb-drives (not shown) to position the mirror group at any desired position along the direction of the arrow A. This also enables a degree of freedom in the trimming of the filter since it can now be moved in a continuous manner into correspondence with any required laser line as desired.

Other actuation techniques are possible, including the use of piezoelectric materials such as PZT, or shape memory alloys.

For some applications it is more important however to provide for a digitally switched filter which is step-tunable to any of the communication laser lines, without passing through any other line. Such a response characteristic can be achieved using the two-cavity device by step-wise tuning one cavity at a time. Transmission is blocked until both cavities coincide.

Frequency responses of up to 100 kHz have been measured on some silicon-air gapped structures highlighting the potential of such micro-electromechanical systems. Thus filters can be devised which can be programmed to provide transmission peaks at any selected wavelength within the range of operation of current and prospective future WDM systems.

A considerable degree of frequency agility can also be effected by exploiting the variation in refractive index of materials with changes in temperature. This is most effective for devices based on solid silicon cavities and can be achieved simply by electrical current flow through the element. This obviates the need to shift the position of any of the mirror groups, so simplifying the construction of the device. Since the mass of the silicon spacer is relatively small, temporal response within 0.1 msec should be achievable provided that the degree of thermal isolation of the element is sufficient.

Although the foregoing description refers to the gaps in the substrate as air gaps, the reader should note that these gaps could be filled with a different material, for example a different fluid or a vacuum. Alteration of the material within the gaps could be used to alter the characteristics of the filter. However, it is preferred to keep the refractive index difference between the substrate and gaps relatively high for reasons outlined above.

What is claimed is:

1. An optical interference filter comprising a substrate in which is formed a plurality of parallel slots so as to define slots and substrate laminae of alternating refractive index whereby light passing through and parallel to the plane of the substrate is filtered as it passes through successive slots and laminae.

2. A filter according to claim 1 wherein the slots are generally perpendicular to a surface of the substrate.

3. A filter according to claim 1 or claim 2 wherein the slots extend inwardly from a single surface of the substrate.

4. A filter according to claim 3 wherein the said single surface is formed with a groove on at least one side of the plurality of slots for accommodating an optic fibre for transmitting said light to and/or from said filter.

5. A filter according to claim 1 and comprising a series of contiguous said layers of the form (aH bL)^x where aH denotes a layer of high refractive index provided by the substrate material, bL denotes a layer of low refractive index provided by a said slot, a and b denote respective integral numbers of quarter wave thicknesses of said layers, and x is an integer denoting the number of repetitions of the unit (aH bL).

6. A filter according to claim 1 wherein the substrate is a semiconductor body.

7. A filter according to claim 1 wherein the substrate is of silicon.

8. A Fabry-Perot resonator filter according to claim 7 of the form (aH bL)^x cH dL cH (bL aH)^y, where cH denotes an odd integral multiple quarter wave thick layer of high refractive index provided by the substrate; dL denotes an even integral multiple quarter wave thick resonator region of low refractive index provided by a slot; and y is an integer, which may have the same value as x or a different value, denoting the number of units (bL aH).

9. A Fabry-Perot resonator filter according to claim 7 of the form (aH bL)^x cH (bL aH)^y, where cH denotes an even integral multiple quarter wave thick resonator region of high refractive index provided by the substrate; and y is an integer, which may have the same value as x or a different value, denoting the number of units (bL aH).

10. A Fabry-Perot resonator filter according to claim 7 wherein the cavity has the form (aH bL)^x cH dL eH (fL gH)^y, where cH, eH and gH denote odd integral multiple quarter wave thick layers of high refractive index provided by the substrate fL denotes an odd integral multiple quarter wave thick layer of low refractive index provided by a slot; dL denotes an even integral multiple quarter wave thick resonator region of low refractive index provided by a slot, and y is an integer, which may have the same value as x or a different value, denoting the number of units (fL, gH).

11. A Fabry-Perot resonator filter according to claim 7 wherein the cavity has the form (aH bL)^x cH (fL, gH)^y, where gH denotes an odd integral multiple quarter wave thick layer of high refractive index provided by the substrate; cH denotes an even integral multiple quarter wave thick resonator region of high refractive index provided by the substrate; fL denotes an odd integral multiple quarter wave thick layer of low refractive index provided by a slot; and y is an integer, which may have the same value as x or a different value, denoting the number of units (fL gH).

12. A filter according to any one of claims 8 to 11 and further comprising tuning means for altering the optical thickness of the resonator region to tune the filter.

13. A filter according to claim 8 or claim 10 and further comprising tuning means for varying the physical thickness of the resonator region dL.

14. A filter according to claim 9 or claim 11 and further comprising tuning means for altering the temperature of the resonator region cH to alter its optical thickness.

15. A filter according to claim 14 wherein the substrate is electrically conductive, and the tuning means includes means for passing an electric current through the substrate.

16. A filter according to claim 14 wherein the substrate is provided with an electrically resistive heating means, and the tuning means includes means for passing an electric current through the heating means.

17. A filter according to claim 15 wherein the tuning means includes thermoelectric means.

18. A filter according to claim 8 wherein at least one further resonator region is optically coupled to said resonator region.

19. A method of tuning a filter as defined in claim 8 including the step of altering the optical thickness of said resonator region.

20. The method according to claim 19 wherein said resonator region includes a central slot, said step including physically altering the thickness of said central slot.

21. The method according to claim 19 wherein said resonator region includes a central region of material provided by said substrate, said step including altering the temperature of said central region.

22. A method of tuning a filter as defined in claim 18 including the step of tuning both or all said resonator regions.

23. A method according to claim 22 wherein one said resonator region is tuned first and subsequently the other said resonator region or resonator regions are tuned until it or all of them coincide with the said one resonator region.

* * * * *